United States Patent [19]
Gordes et al.

[11] Patent Number: 5,994,254
[45] Date of Patent: Nov. 30, 1999

[54] FLUORITE CERAMIC MATERIAL

[75] Inventors: Petru Gordes, Greve; Niels Christiansen, Gentofte, both of Denmark

[73] Assignee: Haldor Topsoe A/S, Lyngby, Denmark

[21] Appl. No.: 09/267,360

[22] Filed: Mar. 15, 1999

Related U.S. Application Data

[60] Provisional application No. 60/080,210, Mar. 31, 1998.
[51] Int. Cl.$^6$ .................................................. C04B 35/50
[52] U.S. Cl. ....................... 501/152; 252/62.2; 252/521; 429/33; 429/304; 429/321; 429/206
[58] Field of Search ........................... 501/152; 252/62.2, 252/521; 429/33, 191, 193, 206; 204/295

[56] References Cited

U.S. PATENT DOCUMENTS 5,665,482  9/1997  Mori et al. .............................. 204/295

*Primary Examiner*—Bruce F. Bell
*Attorney, Agent, or Firm*—Ostrolenk, Faber, Gerb & Soffen LLP

[57] ABSTRACT

A ceramic material, having the general formula:

$$A_xB_yO_{2-\delta}$$

wherein $x \leq 1$ and $y \leq 1$ and $-1 \delta < 1$, and

A is one or more metals selected from the group of Ti, Zr, Hf, Ce and Th or mixtures thereof;

B is at least two metals selected from group 2a, 3b and the lanthanide group of metals.

2 Claims, No Drawings

FLUORITE CERAMIC MATERIAL

This application claims the benefit of U.S. Provisional Application No. 60/080,210, filed Mar. 31, 1998.

BACKGROUND OF THE INVENTION

1. Field of the Invention

The present invention relates to a ceramic material, in particular to fluorite type ceramics for use in the preparation of ion and/or electronic conducting ceramic products, in particular for membranes useful in the separation of oxygen and oxygen containing gas mixture and for electrolytes in fuel cells and electrochemical reactors.

2. Description of the Related Art

Fluorite ceramic materials for use in oxygen transport membranes have the general formula:

$$A_xB_yO_{2-\delta}$$

where $x \leq 1$ and $y \leq 1$ and $-1 < \delta < 1$, and

A is one or more metals selected from the group of Ti, Zr, Hf, Ce and Th,

B is Sm plus at least one metal selected from the group 2a and 3b and other lanthanides.

Classical ceramic materials for oxygen conductors are based on zirconia doped with metal such as Y, Mg and Ca.

Other ceramic oxygen conductors are based on ceria doped with metals such as Y, Sm and Gd. These materials may exhibit mixed ionic and electronic conductivity depending on oxygen partial pressure. The ceria based materials have a higher conductivity than the zirconia based materials at temperatures below 1000° C., which makes the ceria based ceramics useful for commercial oxygen separation, fuel cell applications and catalysts. However, prices for pure ceria and pure dopants are prohibitive for more wide-spread commercialization. Furthermore, the pure mixed oxides typically used may be very refractory and very difficult to sinter into dense ceramic components.

SUMMARY OF THE INVENTION

The invention provides a novel ceramic material having the general formula:

$$A_xB_yO_{2-\delta}$$

where $x \leq 1$ and $y \leq 1$ and $-1 < \delta < 1$, and A is one or more metals selected from the group of Ti, Zr, Hf, Ce and Th, B is at least two metals selected from the group 2a and 3b and other lanthanides.

The ceramic material of the present invention has a fluorite structure with high oxygen ionic or mixed oxygen ionic and electronic conductivity at high or intermediate temperatures.

Other features and advantages of the present invention will become apparent to those skilled in the art from the following detailed description of the preferred embodiment of the invention.

BRIEF DESCRIPTION OF THE PREFERRED EMBODIMENT

In accordance with the present invention, the novel material has the general formula:

$$A_xB_yO_{2-\delta}$$

where $x \leq 1$ and $y \leq 1$ and $-1 < \delta < 1$, and A is one or more metals selected from the group of Ti, Zr, Hf, Ce and Th, B is at least two metals selected from the group 2a, 3b and other lanthanides.

The Ce containing fluorites may be produced by replacing pure Ce raw materials with cheaper Ce concentrates based on partly refined bastnasite minerals.

Bastnasite is a meneral consisting of the cerium metals, which are a group of rare-earth metals which includes, in addition to cerium, lanthanum, praseodymium, neodymium, promethium, samarium and sometimes europium. As the prices for pure dopants designated B in the general formula may be prohibitive for more widespread commercialization these components are replaced according to the present invention with "impure" partly refined mixed oxides containing Sm, Gd and Y.

In a preferred embodiment, A comprises a Ce concentrate of bastnasite, i.e., a concentrate of bastnasite enriched in cerium.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A ceramic material having the general formula:

$$A_xB_yO_{2-\delta}$$

where $x \leq 1$ and $y \leq 1$ and $-1 < \delta < 1$;

A comprises a Ce concentrate of bastnasite minerals; and

B is at least two metals selected from group 2a, 3b and the lanthanide group of metals.

2. The ceramic material of claim 1, wherein B comprises mixed oxides of Sm, Gd and Y.

\* \* \* \* \*